US012607193B2

(12) United States Patent
Lin et al.

(10) Patent No.: US 12,607,193 B2
(45) Date of Patent: Apr. 21, 2026

(54) FAN NOISE CONTROL METHOD AND FAN NOISE CONTROL DEVICE

(71) Applicants: MICRO-STAR INT'L CO., LTD., New Taipei City (TW); MSI ELECTRONIC (KUN SHAN) CO., LTD., Kunshan City (CN)

(72) Inventors: Yi-Fen Lin, New Taipei City (TW); Hsin-Huang Tsai, New Taipei City (TW); Yu-Szu Lee, Taipei City (TW)

(73) Assignees: MICRO-STAR INT'L CO., LTD., New Taipei City (TW); MSI ELECTRONIC (KUN SHAN) CO., LTD., Kunshan City (CN)

( * ) Notice: Subject to any disclaimer, the term of this patent is extended or adjusted under 35 U.S.C. 154(b) by 344 days.

(21) Appl. No.: 18/384,265

(22) Filed: Oct. 26, 2023

(65) Prior Publication Data

US 2025/0067270 A1 Feb. 27, 2025

(30) Foreign Application Priority Data

Aug. 23, 2023 (TW) ................................. 112131702

(51) Int. Cl.
F04D 27/00 (2006.01)
F04D 25/06 (2006.01)
G06F 1/20 (2006.01)
(52) U.S. Cl.
CPC ........... *F04D 27/004* (2013.01); *F04D 25/06* (2013.01); *G06F 1/206* (2013.01)
(58) Field of Classification Search
CPC .. F04D 27/004; F04D 27/006; F04B 2207/03; F04B 45/02; F04B 49/02; G06F 1/20–206

USPC ................................................... 361/690, 695
See application file for complete search history.

(56) References Cited

U.S. PATENT DOCUMENTS

| | | | | |
|---|---|---|---|---|
| 2003/0037193 A1* | 2/2003 | Larson | .................... | G06F 11/24 |
| | | | | 714/E11.154 |
| 2006/0095798 A1* | 5/2006 | Finkelstein | ............. | G06F 1/324 |
| | | | | 713/300 |
| 2009/0167228 A1* | 7/2009 | Chung | .................... | G06F 1/206 |
| | | | | 318/473 |
| 2014/0277818 A1* | 9/2014 | Peterson | ................. | G06F 1/206 |
| | | | | 700/300 |
| 2019/0042383 A1* | 2/2019 | Querbach | ........... | G06F 11/3024 |
| 2019/0073023 A1* | 3/2019 | Kosugi | .................... | G06F 1/206 |

* cited by examiner

*Primary Examiner* — Thomas Fink
(74) *Attorney, Agent, or Firm* — Maschoff Brennan

(57) ABSTRACT

A fan noise control method includes being activated by a power-on signal to perform: controlling a rotation speed of a fan not to be greater than a first predetermined rotation speed, obtaining a power consumption of a computing device, obtaining a first temperature, wherein the first temperature is a temperature of the computing device, obtaining a second temperature, wherein the second temperature is not the temperature of the computing device, and switching from controlling the rotation speed of the fan not to be greater than the first predetermined rotation speed to controlling the rotation speed of the fan according to the first temperature when the power consumption of the computing device is greater than a first predetermined power consumption, or the second temperature is greater than a predetermined temperature.

10 Claims, 3 Drawing Sheets

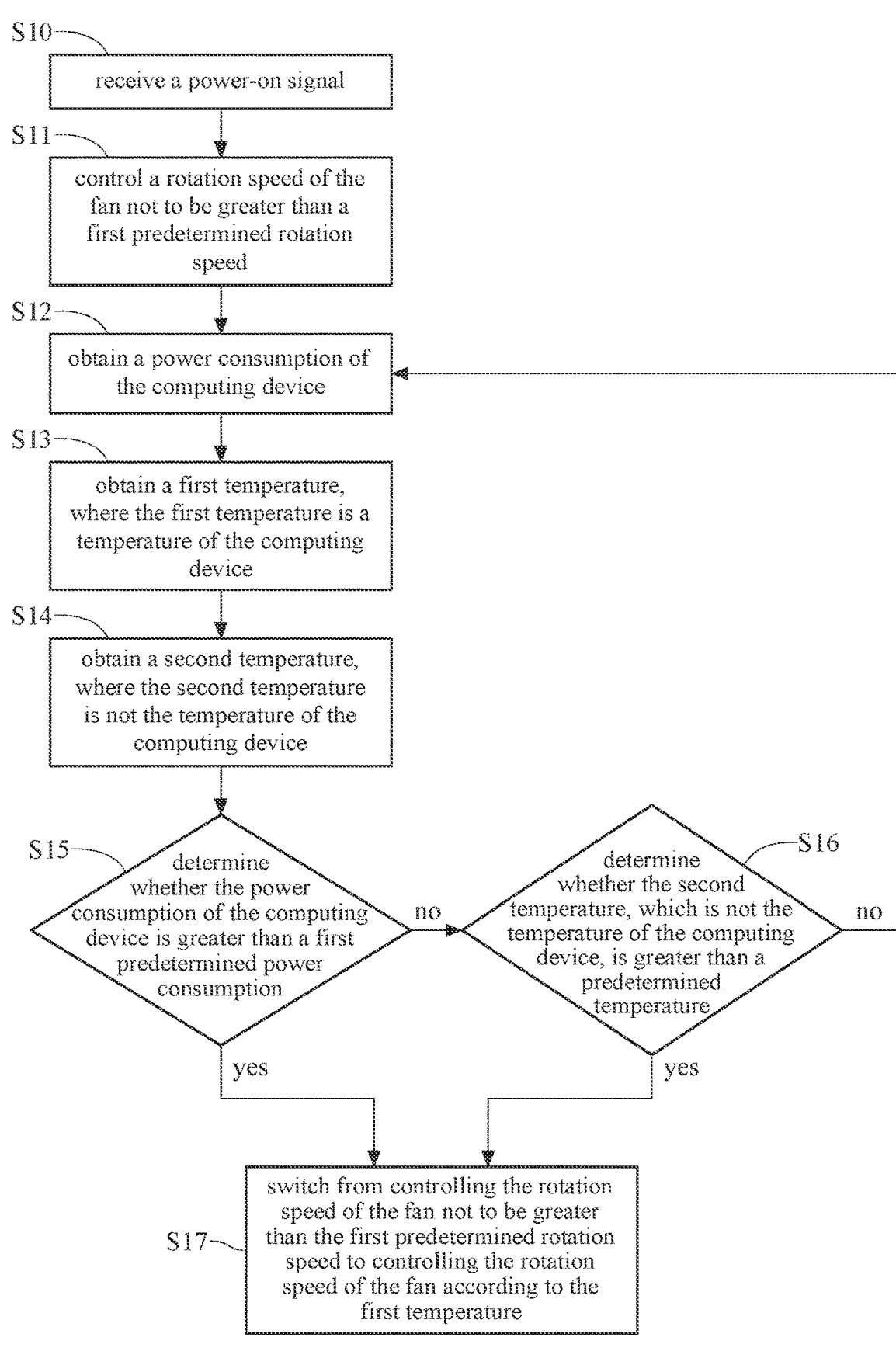

S10 — receive a power-on signal

S11 — control a rotation speed of the fan not to be greater than a first predetermined rotation speed S12 — obtain a power consumption of the computing device S13 — obtain a first temperature, where the first temperature is a temperature of the computing device S14 — obtain a second temperature, where the second temperature is not the temperature of the computing device S15 — determine whether the power consumption of the computing device is greater than a first predetermined power consumption no S16 — determine whether the second temperature, which is not the temperature of the computing device, is greater than a predetermined temperature no yes          yes S17 — switch from controlling the rotation speed of the fan not to be greater than the first predetermined rotation speed to controlling the rotation speed of the fan according to the first temperature

FIG. 2

FAN NOISE CONTROL METHOD AND FAN NOISE CONTROL DEVICE

CROSS-REFERENCE TO RELATED APPLICATIONS

This non-provisional application claims priority under 35 U.S.C. § 119 (a) on Patent Application No(s). 112131702 filed in Taiwan, R.O.C. on Aug. 23, 2023, the entire contents of which are hereby incorporated by reference.

TECHNICAL FIELD

The disclosure relates to a fan noise control method and a fan noise control device.

BACKGROUND

An existing fan noise control method can control the fan through basic input and output system. General fan noise control methods include maintaining a fan at a constant rotation speed, controlling a fan with a switch and controlling a fan according to temperature variation. Maintaining the fan at a constant rotation speed can control noise generated by the fan within a range acceptable to the user. Controlling the fan with the switch allows the user to control the fan to be or not to be in operation through the switch based on the noise level. Controlling the fan according to temperature variation controls the rotation speed of the fan based on temperatures measured by temperature sensors.

However, maintaining the fan in a constant rotation speed and controlling the fan with the switch may adversely affect the heat dissipation condition. Controlling the fan according to temperature variation may cause the fan to operate in full speed during the power-on stage of a system, which generates significant noise. On the other hand, when the system is in an idle state, sometimes the rotation speed of the fan may suddenly increase due to temperature variation, and then decrease after few seconds, causing a poor user experience.

SUMMARY

Accordingly, the disclosure provides a fan noise control method and a fan noise control device.

One embodiment of the disclosure provides a fan noise control method. The fan noise control method includes being activated by a power-on signal to perform: controlling a rotation speed of a fan not to be greater than a first predetermined rotation speed, obtaining a power consumption of a computing device, obtaining a first temperature, wherein the first temperature is a temperature of the computing device, obtaining a second temperature, wherein the second temperature is not the temperature of the computing device, and switching from controlling the rotation speed of the fan not to be greater than the first predetermined rotation speed to controlling the rotation speed of the fan according to the first temperature when the power consumption of the computing device is greater than a first predetermined power consumption, or the second temperature is greater than a predetermined temperature.

Another embodiment of the disclosure provides a fan noise control device. The fan noise control device includes a memory and a processor. The memory stores a plurality of commands. The processor is connected to the memory and configured to read the plurality of commands to perform the aforementioned fan noise control method.

According to the fan noise control method and fan noise control device as discussed in the above embodiments, during the power-on stage of an applicable system, the rotation speed of the fan can be controlled not to be greater than a predetermined rotation speed. After the power consumption of the computing device is determined to be greater than a predetermined power consumption, or the temperature of the system is determined to be greater than a predetermined temperature, the rotation speed of the fan is controlled according to the temperature of the computing device. Therefore, the temperature of the system can be controlled, while the noise of the fan can be reduced; that is, the balance between the temperature of the system and the noise of the fan can be achieved.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 2 is a flow chart of a fan noise control method according to one embodiment of the disclosure;

DETAILED DESCRIPTION

Figure 1:
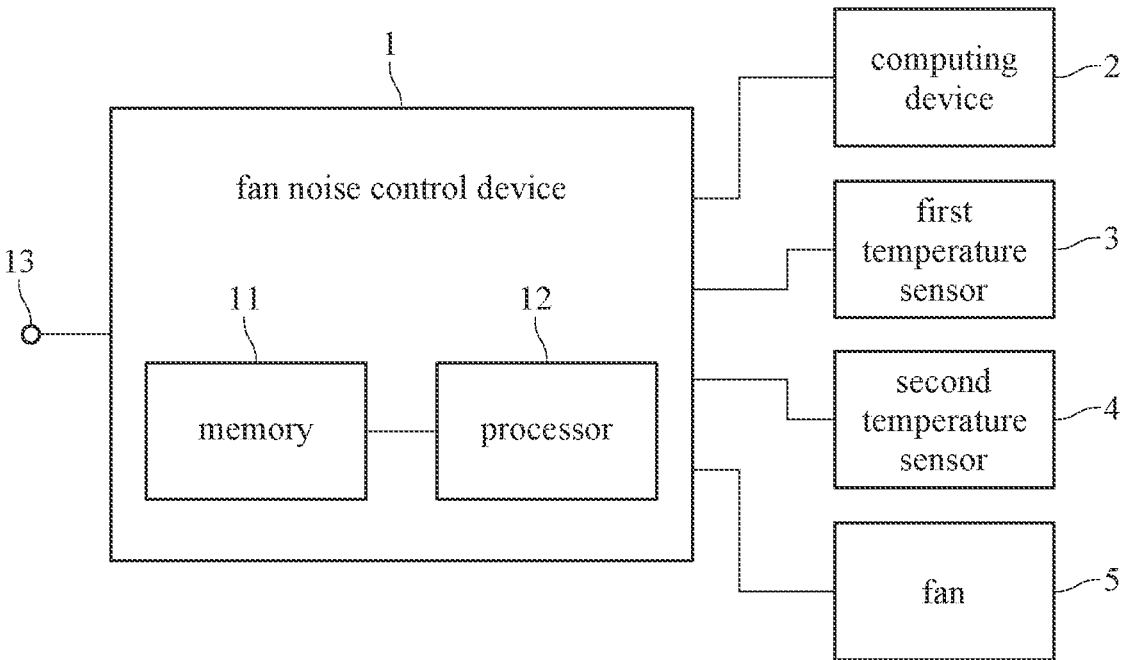
FIG. 1 is a schematic view of a scenario suitable for a fan noise control device according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Referring to FIG. 1, FIG. 1 is a schematic view of a scenario suitable for a fan noise control device according to one embodiment of the disclosure. As shown in FIG. 1, the fan noise control device 1 includes a memory 11 and a processor 12, and further includes a receiving end 13 for receiving external commands. The memory 11 is connected to the processor 12. The fan noise control device 1 is applicable in a computing apparatus, such as a computer or a server. The fan noise control device 1 may be connected to a computing device 2, a first temperature sensor 3, a second temperature sensor 4 and a fan 5 of an applicable system for controlling fan noise.

The fan noise control device 1 may be implemented as an Embedded Controller. The memory 11 of the fan noise control device 1 is configured to store a plurality of commands. The processor 12 is configured to read the commands to perform a fan noise control method, which will be described in the later paragraphs. The fan noise control device 1 can receive the external commands via the receiving end 13. Specifically, the external commands may include a power-on signal transmitted by a power management device of the applicable system, a low-load signal transmitted by a Basic Input/Output System (i.e., BIOS) and/or a standby signal.

The computing device 2 is configured to perform various computations. Specifically, the computing device 2 may be a heat source, such as a central processing unit or a graphics processing unit. The first temperature sensor 3 is configured to measure a temperature of the computing device 2. In detail, the first temperature sensor 3 may be disposed on the computing device 2 for measuring the temperature of the computing device 2. The second temperature sensor 4 is configured to measure a temperature of an object which is not the computing device 2. Specifically, the second temperature sensor 4 may be disposed at a position on a motherboard of the applicable system, which is not in directly contact with the computing device 2, for obtaining a temperature of the motherboard. The fan 5 is configured to cool the applicable system.

Referring to FIGS. 1 and 2, FIG. 2 is a flow chart of a fan noise control method according to one embodiment of the disclosure. As shown in FIG. 2, the fan noise control method comprises steps S10 to S17. The step S10 is to receive a power-on signal. The step S11 is to control a rotation speed of the fan not to be greater than a first predetermined rotation speed. The step S12 is to obtain a power consumption of the computing device. The step S13 is to obtain a first temperature, where the first temperature is a temperature of the computing device. The step S14 is to obtain a second temperature, where the second temperature is not the temperature of the computing device; the step S15 is to determine whether the power consumption of the computing device is greater than a first predetermined power consumption. When the step S15 is determined to be "NO", the step S16 is performed to determine whether the second temperature, which is not the temperature of the computing device, is greater than a predetermined temperature. When the step S15 or S16 is determined to be "YES", the step S17 is perform to switch from controlling the rotation speed of the fan not to be greater than the first predetermined rotation speed to controlling the rotation speed of the fan according to the first temperature. When the step S16 is determined to be "No", the step S12 and the subsequent steps after the step S12 are performed again. The fan noise control method is suitable for the fan noise control device 1 shown in FIG. 1. The following paragraphs will exemplarily describe the fan noise control method in FIG. 2 with the fan noise control device 1 shown in FIG. 1.

In the step S10, the fan noise control device 1 receives the power-on signal. Specifically, the power-on signal may be transmitted by the power management device of the applicable system.

In the step S11, the fan noise control device 1 controls the rotation speed of the fan not to be greater than the first predetermined rotation speed. Specifically, the first predetermined rotation speed may be designated to a fan speed that generates a noise level which is acceptable for a user. Preferably, the first predetermined rotation speed may be 0; that is, the fan 5 is not in operation.

In the step S12, the fan noise control device 1 obtains the power consumption of the computing device 2. Specifically, the said power consumption may be a current power consumption.

In the step S13, the fan noise control device 1 obtains the first temperature, where the first temperature is the temperature of the computing device 2. Specifically, the fan noise control device 1 may take the temperature measured from the computing device 2 by the first temperature sensor 3 as the first temperature.

In the step S14, the fan noise control device 1 obtains the second temperature, where the second temperature is not the temperature of the computing device 2. Specifically, the fan noise control device 1 may take the temperature (e.g., the temperature of the motherboard) measured by second temperature sensor 4 as the second temperature.

In the step S15, the fan noise control device 1 determines whether the power consumption of the computing device 2 is greater than the first predetermined power consumption. Specifically, the fan noise control device 1 may compare the power consumption of the computing device 2 obtained in the step S12 to the first predetermined power consumption. When the power consumption of the computing device 2 is determined to be greater than the first predetermined power consumption in the step 15, the step S17 is performed. When the power consumption of the computing device 2 is determined not to be greater than the first predetermined power consumption in the step 15, the step S16 is performed. For example, the first predetermined power consumption may be an original thermal design power (i.e., TDP), such as 45 watts.

In the step S16, the fan noise control device 1 determines whether the second temperature is greater than the predetermined temperature. Specifically, the fan noise control device 1 can compare the second temperature obtained in the step S14 to the predetermined temperature. When the second temperature is determined to be greater than the predetermined temperature in the step 16, the step S17 is perform. When the second temperature is determined not to be greater than the predetermined temperature in the step 16, the step S12 and the subsequent steps after the step S12 are performed again. For example, the predetermined temperature may be designated according to actual requirements. Taking the temperature of the motherboard as the second temperature for instance, the predetermined temperature may be designated as a critical temperature which may adversely affect the performances of the components on the motherboard.

In the step S17, the fan noise control device 1 switches from controlling the rotation speed of the fan not to be greater than the first predetermined rotation speed to controlling the rotation speed of the fan according to the first temperature. Specifically, when the power consumption of the computing device 2 is greater than the first predetermined power consumption, or the second temperature measured by the second temperature sensor 4 is greater than the predetermined temperature, the fan noise control device 1 can control the rotation speed of the fan 5 according to the first temperature of the computing device 2 obtained from the step S13 instead of controlling rotation speed of the fan 5 not to be greater than the first predetermined rotation speed.

As a result, the fan noise control device 1 can control the fan 5 not to be in operation or control the fan 5 to operate in a low rotation speed when the system is just powered on. After the power consumption of the computing device 2 or the temperature of the system is increased to a certain level, the fan noise control device 1 switches to controlling the fan 5 according to the temperature of the of the computing device 2. Therefore, the significant noise issue of the fan in high speed operation as the system is powered on can be solved, while the manner to control the rotation speed of the fan 5 can be timely switched so as to maintain the heat dissipation requirement.

Note that FIG. 2 merely shows the order of the steps S12 to S16 for instance, but the disclosure is not limited thereto. Except the step S15 is required to be performed after the step S12, and the step S16 is required to be performed after the step S14, the order of the steps S12 to S16 can be modified, or the steps S12 to S16 can be performed simultaneously. In one embodiment, the step S12 and the step S15 may form a loop, the step S14 and the step S16 can form another loop, and the aforementioned loops can be performed in a random order or simultaneously, which is not restricted in the disclosure. In addition, the step S13 not only can be performed between the step S12 and the step S16, but also can be performed after the step S15 or S16 is determined to be "YES".

In some other embodiments, the fan noise control method not only includes the fan noise control device 1 activated by the power-on signal in the step S10 to perform the steps S11 to S17, but also may include the fan noise control device 1 controlling the power consumption of the computing device 2 not to be greater than a first predetermined power consumption in a period of the predetermined mask time after obtaining the power-on signal. In other words, in the period of the predetermined mask time after the step S10, the condition, where the fan noise control device 1 determines whether to switch the manner of controlling the rotation speed of the fan or not, is limited to determining whether a temperature measured by the second temperature sensor 4 is greater than the predetermined temperature. For example, the period of the predetermined mask time represents a period of time where the power is on and the system is entered when the first predetermined power consumption is 45 watts, and the said period of the predetermined mask time may be different depending on a service life of the system, which is not restricted in the disclosure. For instance, the period of the predetermined mask time may be 25 seconds.

Figure 3:
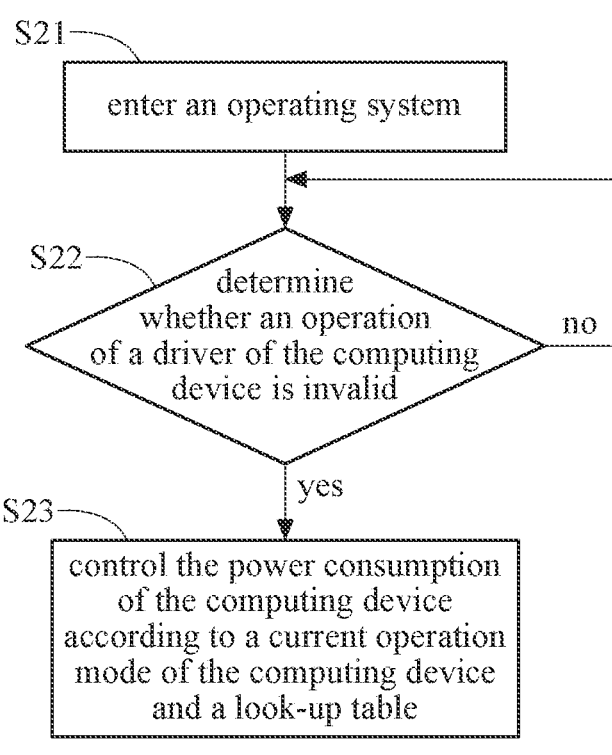
FIG. 3 is a flow chart of a fan noise control method according to another embodiment of the disclosure showing controlling a power consumption of a computing device after entering an operating system.

Referring to FIGS. 1 and 3, FIG. 3 is a flow chart of a fan noise control method according to another embodiment of the disclosure showing controlling a power consumption of a computing device after entering an operating system. In this embodiment, the fan noise control method not only includes the steps S10 to S17 in the power-on stage shown in FIG. 2, but also includes the steps S21 to S23 shown in FIG. 3. The step S21 is to enter an operating system. The step S22 is to determine whether an operation of a driver of the computing device is invalid. When the step S22 is determined to be "YES", the step S23 is performed to control the power consumption of the computing device according to a current operation mode of the computing device and a look-up table. When the step S22 is determined to be "NO", the step S22 is performed again.

In the steps S21 and S22, the computing device 2 enters the operating system, and the fan noise control device 1 determines whether the operation of the drive controlling the power consumption of the computing device 2 is invalid. Specifically, after the computing device 2 enters the operating system, the fan noise control device 1 may monitor whether the operation of the drive of the computing device 2 is invalid. When the operation of the driver of the computing device 2 is invalid, the step S23 is performed. When the operation of the driver of the computing device 2 is not invalid, the step S22 is performed repeatedly. At this moment, the driver controls the power consumption of the computing device 2. More specifically, the fan noise control device 1 periodically transmits a command to the driver and then waits for the driver to respond with a signal. If the driver does not respond with a signal, the driver is determined to be invalid. The said driver is, for example, Dynamic Tuning Technology (i.e., DTT).

In the step S23, the fan noise control device 1 controls the power consumption of the computing device 2 according to the current operation mode of the computing device 2 and the look-up table. Specifically, the fan noise control device 1 may pre-store one look-up table in the memory 11. The said look-up table may include a plurality of predetermined operation modes and a plurality of second predetermined power consumptions which respectively correspond to the predetermined operation modes. Each of the predetermined operation modes may correspond to one or more second predetermined power consumptions. The look-up table is presented as table 1 shown below for instance. More specifically, the look-up table may include a plurality of predetermined operation modes, such as Performance Mode, Balance Mode, Silent Mode and Super Battery Mode, and the look-up table may further include a plurality of second predetermined power consumptions EC PL2, EC PL1, and EC PL4 corresponding to the predetermined operation modes. The value of EC PL1 may be a wattage at which the computing device 2 can operate for a long period of operation time. The value of EC PL2 may be a wattage at which the computing device 2 operates in a limited condition, where the value of EC PL2 is greater than that of EC PL1, and the limited condition is, for example, referred as the limitation in a period of operation time. The value of EC PL4 may be a safe wattage limit about power design that the power of the computing device 2 is not allowed to exceed.

TABLE 1

| Mode | CPU Fan | GPU Fan | dB | | EC PL2 | EC PL1 | EC PL4 |
|---|---|---|---|---|---|---|---|
| Perfor-mance | 93 | 93 | 47 | AC | 165 | 110 | 200 |
| | | | | DC | 51 | 45 | 90 |
| Balance | 72 | 72 | 40 | AC | 109 | 50 | 200 |
| | | | | DC | 45 | 40 | 90 |
| Silent | 50 | 50 | 30 | AC | 45 | 30 | 200 |
| | | | | DC | 30 | 25 | 90 |
| Super Battery | 45 | 45 | 27 | AC | 15 | 15 | 200 |
| | | | | DC | 10 | 10 | 90 |

Figure 4:
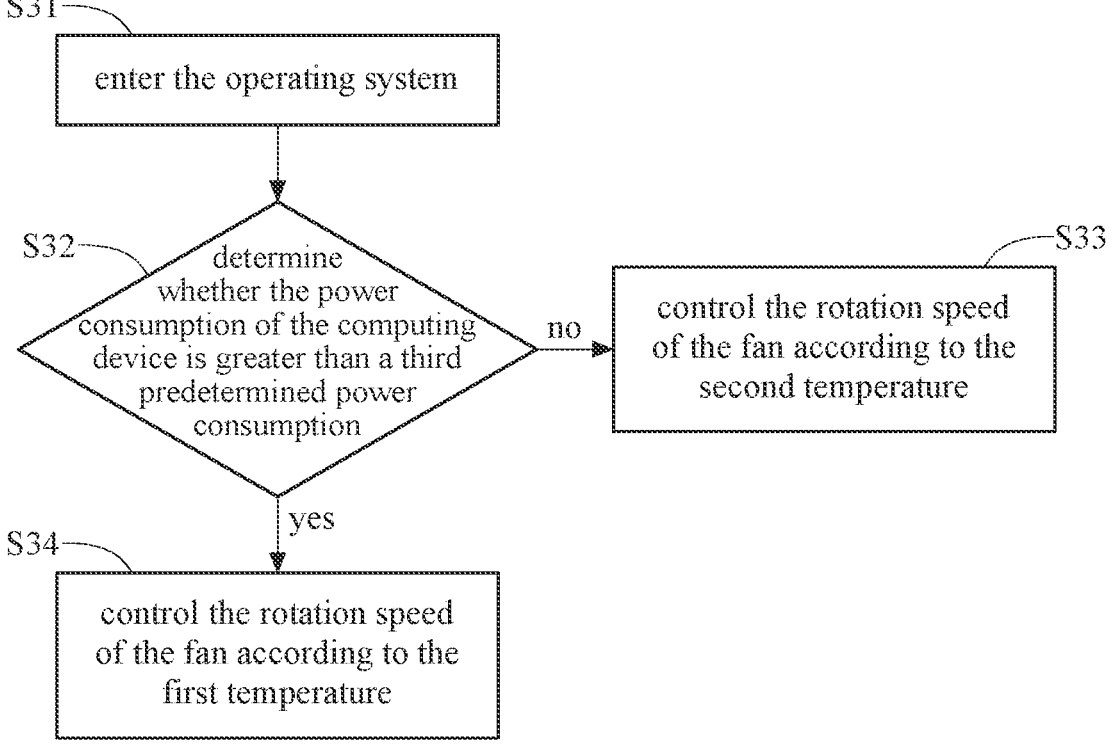
FIG. 4 is a flow chart of a fan noise control method according to another embodiment of the disclosure showing controlling a rotation speed of a fan after entering an operating system.

Referring to FIGS. 1 and 4, FIG. 4 is a flow chart of a fan noise control method according to another embodiment of the disclosure showing controlling a rotation speed of a fan after entering an operating system. In this embodiment, the fan noise control method not only includes the steps S10 to S17 in the power-on stage shown in FIG. 2, but also includes the steps S31 to S34 shown in FIG. 4. The step S31 is to enter the operating system. The step S32 is to determine whether the power consumption of the computing device is greater than a third predetermined power consumption. When the step S32 is determined to be "NO", the step S33 is performed to control the rotation speed of the fan according to the second temperature. When the step S32 is determined to be "YES", the step S34 is performed to control the rotation speed of the fan according to the first temperature. Note that the step S32 is performed when the step S15 or S16 is determined to be "YES"; that is, even entering the operating system, before one of the steps S15 and S16 is determined to be "YES", the steps S15 and S16 are still performed repeatedly.

In the steps S31 and S32, the computing device 2 enters the operating system, and the fan noise control device 1 determines whether the power consumption of the computing device 2 is greater than the third predetermined power consumption. Specifically, after the computing device 2 enters the operating system, the fan noise control device 1 may determine whether the power consumption of the computing device 2 is greater than the third predetermined power consumption. When the power consumption of the computing device 2 is not greater than the third predetermined power consumption, the step S33 is performed. When the power consumption of the computing device 2 is greater than the third predetermined power consumption, the step S34 is performed. More specifically, whether the power consumption of the computing device 2 is greater than the third predetermined power consumption can be used to determine the computing device 2 is currently in a low-load state or a high-load state. When the power consumption of the computing device 2 is not greater than the third predetermined power consumption, it represents that the computing device 2 is in the low-load state. When the power consumption of the computing device 2 is greater than the third predetermined power consumption, it represents that the computing device 2 is in the high-load state. The said third predetermined power consumption may be an original thermal design power (i.e., TDP), such as 45 watts.

In the step S33, the fan noise control device 1 controls the rotation speed of the fan according to the second temperature. Specifically, when the power consumption of the computing device 2 is not greater than the third predetermined power consumption, the fan noise control device 1 can control the rotation speed of the fan 5 according to the second temperature measured by the second temperature sensor 4. More specifically, when the computing device 2 is in the low-load state, the fan noise control device 1 may control the rotation speed of the fan 5 according to the measured temperature of the motherboard.

In the step S34, the fan noise control device 1 controls the rotation speed of the fan according to the first temperature. Specifically, when the power consumption of the computing device 2 is greater than the third predetermined power consumption, the fan noise control device 1 may control the rotation speed of the fan 5 according to the first temperature measured by the first temperature sensor 3. More specifically, when the computing device 2 is in the high-load state, the fan noise control device 1 may control the rotation speed of the fan 5 according to the temperature of the computing device 2.

In some other embodiments, the fan noise control method may simultaneously include the steps in the power-on stage shown in FIG. 2 and the steps after entering the operating system shown in FIGS. 3 and 4.

In some other embodiments, the fan noise control method not only includes the steps in the power-on stage and/or after entering the operating system described in the aforementioned embodiments, but also may include the fan noise control device 1 activated by a standby signal to perform controlling the power consumption of the computing device 2 not to be greater than a fourth predetermined power consumption. Specifically, the said standby signal can be a signal for driving the computing device 2 to enter a Modern Standby mode, such as a signal of SLP_S0 pin of Platform Controller Hub (i.e., PCH). For example, the fourth predetermined power consumption may be designated as 15 watts.

In some other embodiments, the fan noise control method not only includes the steps in in the power-on stage, the steps after entering the operating system and/or the steps after entering the standby-mode, but also may further include the fan noise control device 1 activated by the standby signal to perform turning off the fan 5, and when the fan noise control device 1 determines that a platform controller hub signal associated with the standby signal is not maintained in a low electric potential, the fan noise control device 1 reboots the fan 5 and controls the rotation speed of the fan 5 not to be greater than the second predetermined rotation speed since the applicable system may switch between an asleep state and an awake state back and forth and thus may be insufficient in heat dissipation. For example, the second predetermined rotation speed may be 40% of working ratio (e.g., 2400 RPM).

According to the fan noise control method and fan noise control device as discussed in the above embodiments, during the power-on stage of the applicable system, the rotation speed of the fan can be controlled not to be greater than a predetermined rotation speed. After the power consumption of the computing device is determined to be greater than a predetermined power consumption, or the temperature of the system is determined to be greater than a predetermined temperature, the rotation speed of the fan is controlled according to the temperature of the computing device. Therefore, the temperature of the system can be controlled, while the noise of the fan can be reduced; that is, the balance between the temperature of the system and the noise of the fan can be achieved. In addition, the power consumption of the computing device can be controlled according to the operation of the driver after entering the operating system, the rotation speed of the fan can be controlled according to the loading of the computing device after entering the operating system, the power consumption of the computing device can be controlled after the fan noise control device is activated by the standby signal, and/or the rotational speed of the fan can be controlled after the fan noise control device is activated by the standby signal, such that the fan noise control method and the fan noise control device can reduce the noise of the fan when the system is in the low-load state and/or the standby state while maintaining the system in an appropriate temperature, which improves the user's experience.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A fan noise control method, comprising being activated by a power-on signal to perform:

controlling a rotation speed of a fan not to be greater than a first predetermined rotation speed;

obtaining a power consumption of a computing device;

obtaining a first temperature, wherein the first temperature is a temperature of the computing device;

obtaining a second temperature, wherein the second temperature is not the temperature of the computing device; and switching from controlling the rotation speed of the fan not to be greater than the first predetermined rotation speed to controlling the rotation speed of the fan according to the first temperature when the power consumption of the computing device is greater than a first predetermined power consumption, or the second temperature is greater than a predetermined temperature.

2. The fan noise control method according to claim 1, further comprising:

controlling the power consumption of the computing device not to be greater than the first predetermined power consumption in a period of a predetermined mask time after obtaining the power-on signal.

3. The fan noise control method according to claim 2, wherein the period of the predetermined mask time is 25 seconds, and the first predetermined power consumption is an original thermal design power.

4. The fan noise control method according to claim 1, further comprising:

monitoring an operation of a driver of the computing device after entering an operating system; and controlling the power consumption of the computing device according to a current operation mode of the computing device and a look-up table when the operation of the driver is invalid; wherein the look-up table comprises a plurality of predetermined operation modes and a plurality of second predetermined power consumptions which respectively correspond to the plurality of predetermined operation modes.

5. The fan noise control method according to claim 1, further comprising:

determining whether the power consumption of the computing device is greater than a third predetermined power consumption after entering an operating system;

controlling the rotation speed of the fan according to the second temperature when the power consumption of the computing device is not greater than the third predetermined power consumption; and controlling the rotation speed of the fan according to the first temperature when the power consumption of the computing device is greater than the third predetermined power consumption.

6. The fan noise control method according to claim 1, further comprising being activated by a standby signal to perform:

controlling the power consumption of the computing device not to be greater than a fourth predetermined power consumption.

7. The fan noise control method according to claim 1, further comprising being activated by a standby signal to perform:

turning off the fan; and rebooting the fan and controlling the rotation speed of the fan not to be greater than a second predetermined rotation speed when a platform controller hub signal associated with the standby signal is determined not to be maintained in a low electrical potential.

8. The fan noise control method according to claim 1, wherein the second temperature is a temperature of a motherboard.

9. The fan noise control method according to claim 1, wherein the first predetermined rotation speed is 0.

10. A fan noise control device, comprising:

a memory, storing a plurality of commands; and a processor, connected to the memory and configured to read the plurality of commands to perform the fan noise control method according to claim 1.

* * * * *